(12) United States Patent
Kozaki et al.

(10) Patent No.: US 7,139,487 B2
(45) Date of Patent: Nov. 21, 2006

(54) LIGHT BURST TRANSMISSION/RECEPTION CONTROL SYSTEM, PARENT STATION DEVICE USED IN THE SAME, CHILD STATION DEVICE, AND LIGHT BURST TRANSMISSION/RECEPTION CONTROL METHOD

(75) Inventors: Seiji Kozaki, Tokyo (JP); Hiroshi Ichibangase, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 621 days.

(21) Appl. No.: 10/049,855

(22) PCT Filed: Jun. 8, 2001

(86) PCT No.: PCT/JP01/04847

§ 371 (c)(1),
(2), (4) Date: Feb. 19, 2002

(87) PCT Pub. No.: WO01/99351

PCT Pub. Date: Dec. 27, 2001

(65) Prior Publication Data

US 2002/0114043 A1 Aug. 22, 2002

(30) Foreign Application Priority Data

Jun. 19, 2000 (JP) ............................. 2000-183686

(51) Int. Cl.
*H04J 14/08* (2006.01)

(52) U.S. Cl. .................... 398/100; 398/72; 398/66; 398/67; 398/68; 398/69; 398/70; 398/71; 398/98; 398/99; 398/75; 398/79; 398/42; 398/57; 398/165; 398/167.5; 398/168; 370/468; 370/230; 370/442; 370/314; 455/525; 455/524

(58) Field of Classification Search ................ 370/468, 370/84, 230, 319, 336, 312, 79, 442, 314; 398/42, 57, 72, 66, 99, 67, 98, 68, 100, 69, 398/70, 71, 75, 79, 165, 167.5, 168; 455/525, 455/524

See application file for complete search history.

(56) References Cited

U.S. PATENT DOCUMENTS

| 6,091,740 | A | 7/2000 | Karasawa | |
|---|---|---|---|---|
| 6,201,622 | B1 * | 3/2001 | Lobbett et al. | 398/180 |
| 6,393,007 | B1 * | 5/2002 | Haartsen | 370/337 |
| 6,778,557 | B1 * | 8/2004 | Yuki et al. | 370/468 |

(Continued)

FOREIGN PATENT DOCUMENTS

JP 10-336187 A 12/1998

(Continued)

*Primary Examiner*—Hanh Phan
(74) *Attorney, Agent, or Firm*—Birch, Stewart, Kolasch & Birch, LLP

(57) ABSTRACT

A host station apparatus (10) generates band allocation information including identifications of slave station apparatuses (20-1 through 200-n) and types of data to be transmitted by the slave station apparatuses and posts the information to the plural slave station apparatuses (20-1 through 20-n). The plural slave station apparatuses (20-1 through 20-n) identify as to whether or not the band allocation information is band allocation information about the data types of the slave station apparatuses respectively, and when the band allocation information is band allocation information about the data types of the slave station apparatuses, they control to transmit data to the host station apparatus (10) according to the data types represented by the band allocation information.

10 Claims, 11 Drawing Sheets

U.S. PATENT DOCUMENTS 6,909,719 B1 * 6/2005 Petersson et al. ...... 370/395.21

FOREIGN PATENT DOCUMENTS

| JP | 11-17685 A | 1/1999 |
| JP | 11-46198 A | 2/1999 |
| JP | 11-46199 A | 2/1999 |
| JP | 2000-36828 A | 2/2000 |

* cited by examiner

LIGHT BURST TRANSMISSION/RECEPTION CONTROL SYSTEM, PARENT STATION DEVICE USED IN THE SAME, CHILD STATION DEVICE, AND LIGHT BURST TRANSMISSION/RECEPTION CONTROL METHOD

This application is the national phase under 35 U.S.C. § 371 of PCT International Application No. PCT/JP01/04847 which has an International filing date of Jun. 8, 2001, which designated the United States of America.

Optical burst transmission/reception control system, host station and slave station apparatus to be used therein, and optical burst transmission/reception control method

TECHNICAL FIELD

The present invention relates to an optical burst transmission/reception control system where a plurality of slave station apparatuses commonly use a transmission medium and a transmission band, a host apparatus posts band allocation information for controlling allocation of use transmission bands of the respective slave station apparatuses to the respective slave station apparatuses, and the slave station apparatuses transmit data to the host station apparatus based on the band allocation information posted from the host station apparatuses, the host station apparatus and the slave station apparatus to be used in this system, and an optical burst transmission/reception control method.

BACKGROUND ART

Conventionally, as a system where a plurality of slave station apparatuses commonly use a transmission medium and a transmission band and the respective slave station apparatuses transmit data to a host station apparatus according to band control by the host station apparatus, for example, an optical network having n-numbered ONUs (Optical Network Units) and one OLT (Optical Distribution Termination) shown in FIG. 5/G.983.1-Generic physical configuration of the Optical Distribution Network of Recommendation G. 983. 1 (Broadband optical access systems based on Passive Optical Networks (PON) 1998/10) is known.

FIG. 7 is a block diagram showing a schematic structure of the above-mentioned optical network. In FIG. 7, OLT is a host station apparatus, and a plurality of ONUs are slave station apparatuses. Moreover, ODN (Optical Distribution Network) is a transmission medium composed of an optical fiber, an optical multiplexer/branching filter and the like. FIG. 8 is a diagram showing formats of data in a direction from OLT side to ONU side (downstream) and data in a direction from ONU side to OLT side (upstream) shown in ITU-T Recommendation FIG. 11/G. 983. 1-Frame format for 155.52/155.52 Mbit/s PON. As shown in FIG. 8, the downstream data are composed of a fixed length cell of 53 bytes, and the upstream data are composed of a fixed length cell of 56 bytes. The downstream data are multiple-addressed from one OLT to all ONUs, and as for the upstream data, data transmission to one ONU is allowed to be transmitted by OLT for each time slot of each cell.

The permission of the data transmission for each upstream time slot, namely, the post of the band allocation information is defined by the format of the downstream data, and is inserted into a monitor and control (PLOAM: Physical Layer Operations Administration and Maintenance) cell which is transmitted in a cycle of 28 cells. This band allocation information is inserted as each byte of "GRANT 1" through "GRANT 27" of PLOAM cell as described in Table 8/G. 983. 1-Payload content of downstream PLOAM cell of ITU-T Recommendation. As shown in FIG. 8, since the upstream data exist in 53 slots for each frame, "GRANT 1" through "GRANT 27" which are inserted in the first PLOAM cell in the downstream frame show band allocation information for the first through 27th time slots in the upstream frame, and "GRANT 1" through "GRANT 27" which are inserted in the second PLOAM cell in the downstream frame show band allocation information for the 28th through 53rd time slots in the upstream frame. Namely, the allocation to the 53 time slots in the upstream frame is instructed by "GRANT 1" through "GRANT 27" which are inserted in the two PLOAM cells in the downstream frame.

The format of "GRANT" is shown in Table 10/G. 983. 1-Specification of the grants in ITU-T Recommendation. In "Table", a type of "GRANT" allocated to use of the upstream slots of ONUs is "DataGRANT" or "PLOAMGRANT". "PLOAMGRANT" is allocated to transmission of PLOAM cell in the upstream direction, and for allocation for transmission of normal data, "Data GRANT" is used. A value to be used in "Data GRANT" is arbitrary except for partial reserved values. Values of "Data GRANT" to be previously used by respective ONUs as well as values of "PLOAM GRANT" are posted to the respective ONUs from OLT by messages included in the downstream PLOAM cells in order that the respective ONUs themselves recognize the band allocation. The formats of the messages are shown in Grant allocation message in Downstream message formats ITU-T Recommendation, 8.3.8.2.1. One of these messages is transmitted to ONU, and a value of "Data GRANT" and a value of "PLOAM GRANT" to be used by this ONU are shown. The ONU receives this message and stores the value as initial setting, and as a result, in the case where stored "GRANT" exists in "GRANT 1" through "GRANT 27" in the PLOAM cells transmitted from OLT, the ONU recognizes that band allocation of the upstream time slot exists for the ONU itself.

In such a manner, OLT sets "Data GRANT" and "PLOAM" which are individual values for the respective ONUs, and before the respective ONUs transmit upstream data, they transmit messages so as to manage the band allocation for the respective ONU in the upstream slots. ONU does not transmit data in a slot where band allocation to this ONU does not exist so as to prevent conflict of data in an upstream transmission line.

Incidentally, in the optical network, since a type of data transmitted by ONU cannot be discriminated, services stored in ONU cannot be occasionally satisfied sufficiently. For example, in the case where periodic data such as sound data which require periodic transmission upon real-time request and burst data which are transmitted in a burst manner such as file transmission between computers coexist, it is occasionally difficult to hold the periodic transmission of the periodic data such as sound data securely.

With reference to FIGS. 9 and 10, there will be explained below the case where the periodic transmission of the periodic data becomes difficult. FIG. 9 is a block diagram showing a structure of a conventional optical burst transmission/reception system, and FIG. 10 is a time chart showing a data transmission state in the case where ONU (slave station apparatus) stores a service which requires data transmission of the periodic data and a service which requires data transmission of the burst data.

In FIG. 9, a host station apparatus 10 is connected to a plurality of slave station apparatuses 20-1 through 20-n via a main fiber 31, an optical splitter 30 and branch fibers 32-1 through 32-n. The optical splitter 30 branches an optical signal from the host station apparatus 10 and transmits the branched signals to the slave station apparatuses 20-1 through 20-n, and multiplexes the optical signals from the slave station apparatuses 20-1 through 20-n and transmits the multiplexed signal to the host station apparatus 10.

Firstly the host station apparatus 10 has a code allocation section 14, and the code allocation section 14 previously sets codes as values of "GRANT" for the respective slave station apparatuses 20-1 through 20-n, and transmits the values of "GRANT" to a management signal transmission section 12. The management signal transmission section 12 allows the input values of "GRANT" to be contained in a PLOAM cell (management signal) in a format that the values can be identified by the slave station apparatuses 20-1 through 20-n, and transmits the management signal to an optical transmitter-receiver 11. Here, as for a corresponding relationship between the slave station apparatuses 20-1 through 20-n and the values of "GRANT", sets of preset identification numbers of the slave station apparatuses 20-1 through 20-n and the values of "GRANT" are posted from the host station apparatus 10 to the slave station apparatuses 20-1 through 20-n respectively.

The optical transmitter-receiver 11 converts the management signal into an optical signal, and transmit the optical signal to the optical splitter 30 via main fiber 31. The optical splitter 30 distributes the optical signal via the branch fibers 32-1 through 32-n so as to transmit it to the slave station apparatuses 20-1 through 20-n. Respective optical transmitter-receivers 21 in the slave station apparatuses 20-1 through 20-n convert input optical signals into electrical signals, and transmit them to at least code identification sections 22 and allocation identification sections 23. The code identification section 22 fetches a management signal from the input electrical signal, and fetches the identification number preset in its slave station apparatus and a value of "GRANT" relating to this identification number and stores them.

Thereafter, the band allocation section 13 of the host station apparatus 10 transmits the values of "GRANT" presets for the slave station apparatuses 20-1 through 20-n to the management signal transmission section 12 with frequency according to bands required by the slave station apparatuses 20-1 through 20-n, and the management signal transmission section 12 inserts the values of "GRANT" into the slot allocation areas in the upstream direction in the management signal, and multiple-addresses the management signal to the slave station apparatuses 20-1 through 20-n via the optical transmitter-receiver 11. In the case where the band allocation is large, a lot of areas containing codes (values of GRANT) of the slave station apparatuses with large band allocation appear in the slot allocation areas in the upstream direction, and in the case where the band allocation is small, areas containing codes of the slave station apparatuses with small band allocation are less in the slot allocation areas in the upstream direction. Namely, an interval of appearance of the codes allocated to the slave station apparatuses change due to the band allocation. The band allocation is posted from the host station apparatus 10 to the slave station apparatuses 20-1 through 20-n repeatedly.

The code identification sections 22 of the slave station apparatuses 20-1 through 20-n detect the values of "GRANT" in the management signal and posts them to data reading sections 24. The data reading sections 24 check the values in the allocation areas in the respective slot input from the allocation identification sections 23, and when the values match with the codes posted from the code identification sections 22, the data reading sections 24 execute data reading process on the upstream time slots corresponding to the matched slots. This data reading process attempts to read the data from a buffer memory 25a, and when there exist no data to be read, the process reads data from a buffer memory 25b. The read data are multiplexed by a multiplexing section 27, and are transmitted to the data reading section 24. The data reading section 24 transmits the multiplexed data to the optical transmitter-receiver 21, and transmits them to the host station apparatus 10 via the branch fibers 32-1 through 32-n, the optical splitter 30 and the main fiber 31. When there exist no data to be read in the buffer memories 25a nor 25b, the data reading section 24 generates empty data so as to transmit them to the optical transmitter-receiver 21.

The data to be input into the buffer memory 25a of the slave station apparatus 20-1 are periodic data 26a, and the data to be input into the buffer memory 25b are burst data 26b. The data reading section 24 makes control so as to read the periodic data 26a in the buffer memory 25a in preference to the burst data 26b in the buffer memory 25b. This is because the burst data to be input in the burst manner do not normally require real-time property unlike sound data, and even if transmission is delayed to a certain extent, all of the burst data may be transmitted, but as the periodic data require real-time property, it is necessary that the periodic data have periodicity and are transmitted in a state that a delay is reduced as much as possible.

There will be explained below the data reading process in the case where the periodic data 26a ("a1" through "a4") shown in FIG. 10(a) and the burst data 26b ("b1" through "b4") shown in FIG. 10(b) are input respectively into the buffer memories 25a and 25b. The data reading section 24 reads the data from the buffer memories 25a and 25b with an interval equivalent to a sum of the bands required for transmission of the periodic data and the burst data (interval of data reading signals shown in FIG. 10(c)) correspondingly to the codes identified by the allocation identifying section 23 (band allocation information). In this case, since the periodic data 26a are read in preference to the burst data 26b, as shown in FIG. 10(d), the read data, which are read by the data reading section 24 and are transmitted to the optical transmitter-receiver 21, are read with an interval equal with or double interval of a data reading signal shown in FIG. 10(c). As a result, the transmission interval of the periodic data 26a is not periodic. For example, the periodic data "a4" deviate from the periodicity.

In order to solve this problem, the band allocation section 13 of the host station apparatus 10 generates values of "GRANT" with the same period as the periodic data and additionally generates values of "GRANT" for the burst data in the burst manner, and the slave station apparatus 20-1 transmits their multiplexed result to the host station apparatus (see FIG. 11). In this case, the periodicity of the periodic data "a1" through "a4" is maintained. Particularly in the case where time difference between the periodic data to be input into the buffer memory 25a and "GRANT" generated for the periodic data, namely time difference between the periodic data and the data reading signal is small, the periodic data "a1" through "a4" transmitted from the slave station apparatus 20-1 keep the periodicity.

However, as shown in FIG. 12, the in the case where time difference between the periodic data input into the buffer memory 25a and the data reading signal is large, at the time of the reading by means of the data reading signal corresponding to "GRANT" allocated for the burst data, the input periodic data exist and they are read preferentially. For this reason, there arises a problem that the periodicity of the periodic data is not ipso facto maintained unlike the periodic data "a2" (see period Tv1 and period Tv2 in FIG. 12).

The difference between the system shown in FIG. 11 and the system shown in FIG. 12 is only a time relationship between the periodic data input into the slave station apparatus 20-1 and the value of "GRANT" generated from the host station apparatus 10 (data reading signal). In this case, the host station apparatus 10 can recognize a slot interval Tc required for electric transfer of the periodic data, but difficultly recognizes timing at which the periodic data are input into the slave station apparatus 20-1. This is because the transmission time of the periodic data capable of being recognized by the host station apparatus 10 is only a slot position allocated by the host station apparatus 10 originally. For this reason, it is difficult to securely avoid collapse of the periodicity of the periodic data shown in FIG. 11.

Here, there considers a system which once stores data whose periodicity is collapsed into a buffer memory and reads periodic data from this buffer memory periodically so as to compensate the periodicity. However, in this case, there arises a problem that transmission delay due to the storage of the periodic data occurs and the original characteristic of the periodic data which requires real-time property cannot be kept securely.

Therefore, it is an object of the present invention to provide an optical burst transmission/reception control system in which in the case where periodic data and burst data are multiplexed so as to be transmitted from one slave station apparatus to a host station apparatus, periodicity of the periodic data is maintained and delay of the periodic data can be suppressed minimally, a host station apparatus and a slave station apparatus to be used in the system, and an optical burst transmission/reception control method.

DISCLOSURE OF THE INVENTION

In the optical burst transmission/reception control system according to one aspect of the present invention comprises a plurality of slave station apparatuses which commonly use a transmission medium and a transmission band, and a host station apparatus posts band allocation information for controlling allocation of use transmission bands of the slave station apparatuses to the slave station apparatuses. The respective slave station apparatuses transmit data to the host station apparatus based on the band allocation information posted from the host station apparatus. The host station apparatus has a band allocation control unit which generates the band allocation information including identifications of the slave station apparatuses and types of data to be transmitted by the slave station apparatuses and posting the information to the plurality of slave station apparatuses. The plurality of slave station apparatuses have a data transmission control which identifies as to whether or not the band allocation information is band allocation information about the data types of their slave station apparatuses, and when the band allocation information is the band allocation information about the data types of their slave station apparatuses, making control so as to transmit data to the host station apparatus according to the data types represented by the band allocation information.

According to this invention, the band allocation control unit of the host station apparatus generates the band allocation information including identifications of the slave station apparatuses and types of data to be transmitted by the slave station apparatuses, and posts the information to the plural slave station apparatuses, and the data transmission control unit of the plural slave station apparatuses identify as to whether or not the band allocation information is band allocation information for the types of data in their slave station apparatuses, and when the band allocation information is the band allocation information for the types of data in their slave station apparatuses, the data transmission control unit controls itself to transmit data to the host station apparatus according to the types of data represented by the band allocation information.

In the above-mentioned optical burst transmission/reception control system, the host station apparatus allows the band allocation information to be included in a management information cell so as to post it to the respective slave station apparatuses.

Thus, the host station apparatus posts the band allocation information included in the management information cell to the slave station apparatuses.

In the above-mentioned optical burst transmission/reception control system, the band allocation information is use authorizing information of time slots defined in a transmission direction from the slave station apparatuses to the host station apparatus.

Thus, the band allocation information is time slot use authorizing information defined in the transmission direction from the slave station apparatuses to the host station apparatus.

In the above-mentioned optical burst transmission/reception control system, the data types are types of fixed-speed data which require a real-time property and should be transmitted with constant period and burst data which are generated by transmission request intermittently or temporarily.

Thus, the data types are classified into the fixed-speed dada, which requires the real-time property and should be transmitted with constant period, and the burst data which are generated by transmission request intermittently or temporarily.

In the above-mentioned optical burst transmission/reception control system, the host station apparatus further has a band change request detection unit which detects intermittent or temporal generation of band change request; and the band allocation control unit, as initial setting, allocates a band to fixed-speed data to be transmitted with constant period, and when the band change request detection unit detects band change request, the band allocation unit allocates a band to burst data which are newly generated intermittently or temporarily.

Thus, the band request detection unit of the host station apparatus detects generation of the intermittent or temporary band change request, and as initial setting the band allocation control unit allocates a band to the fixed-speed data to be transmitted with constant period, and in the case where the band request detection unit detects the band change request, the band allocation control unit allocates a band to the burst data which are newly generated intermittently or temporarily.

In the above-mentioned optical burst transmission/reception control system, the slave station apparatuses further have a band request unit which, when burst data are generated by transmission request intermittently or temporarily, requests the host station apparatus to allocate a band to the burst data.

Thus, when burst data are generated by the transmission request intermittently or temporarily the band request unit of the slave station apparatus request the host station apparatus to allocate a band to the burst data.

In the above-mentioned optical burst transmission/reception control system, the band allocation information is information about grouped plural data types; the band allocation control unit presets information, which represents a band ratio of the grouped plural data types, in the band allocation information; and the data transmission control unit identifies as to whether or not the band allocation information is band allocation information about grouped data types of their slave station apparatuses, and when the band allocation information is the band allocation information about the grouped data types of the slave station apparatuses, transmits data of the grouped plural types represented by the band allocation information according to the band ratio.

Thus, the band allocation information is information about a plurality of data types divided into groups, and the band allocation control unit presets information representing a band ratio between the grouped plural data types in the band allocation information, and the data transmission control unit identifies as to whether or not the band allocation information is band allocation information about the grouped data types of the slave station apparatus. When the band allocation information is the band allocation information about the grouped data type of the slave station apparatus, the data transmission control unit transmits the data of the grouped plural data types represented by the band allocation information according to the band ratio.

In the above-mentioned optical burst transmission/reception control system, when the band allocation control unit controls band allocation for a slave station apparatus which does not identify a type of data to be transmitted, the band allocation control unit posts band identification information including identification of the slave station apparatus to the slave station apparatus, and when the band allocation control unit controls band allocation for a slave station apparatus which identify a type of data to be transmitted, the band allocation control unit posts band allocation information including the identification of the slave station apparatus and the data type to the slave station apparatus.

Thus, when the band allocation control unit controls band allocation for a slave station apparatus which does not identify a type of data to be transmitted, the band allocation control unit posts band identification information including identification of the slave station apparatus to the slave station apparatus. When the band allocation control unit controls band allocation for a slave station apparatus which identify a type of data to be transmitted, the band allocation control unit posts band allocation information including identification of a slave station apparatus and the type of data to the slave station apparatus. Further, the slave station apparatuses having various structures and functions coexist.

The host station apparatus according to another aspect of the present invention is used in an optical burst transmission/reception control system. This optical burst transmission/reception control system includes a plurality of slave station apparatuses which commonly use a transmission medium and a transmission band, and a host station apparatus posts band allocation information for controlling allocation of use transmission bands of the slave station apparatuses to the slave station apparatuses. The respective slave station apparatuses transmit data to the host station apparatus based on the band allocation information posted from the host station apparatus. The host/device comprises a band allocation control unit which generates the band allocation information including identifications of the slave station apparatuses and types of data to be transmitted by the slave station apparatuses, and posting the information to the plural slave station apparatuses.

According to the above-mentioned aspect, the band allocation control unit generates the band allocation information including identifications of the respective slave station apparatuses and types of data to be transmitted by the slave station apparatuses, and posts them to the plural slave station apparatuses.

The slave station apparatus according to still another aspect of the present invention is used in an optical burst transmission/reception control system. This optical burst transmission/reception control system includes a plurality of slave station apparatuses which commonly use a transmission medium and a transmission band, and a host station apparatus posts band allocation information for controlling allocation of use transmission bands of the slave station apparatuses to the slave station apparatuses. The respective slave station apparatuses transmit data to the host station apparatus based on the band allocation information posted from the host station apparatus. The slave station apparatus comprises a data transmission control unit which identifies as to whether or not the band allocation information is band allocation information about a data type of its slave station apparatus, and when the band allocation information is the band allocation information about the data type of the slave station apparatus, making control so as to transmit data to the host station apparatus.

According to the above-mentioned aspect, the data transmission control unit identifies as to whether or not the band allocation information is band allocation information about data types of their station apparatus, and when the band allocation information is band allocation information about the data type of the station apparatus, the data transmission control unit makes control so as to transmit data to the host station apparatus according to data types represented by the band allocation information.

The optical burst transmission/reception control method according to still another aspect of this invention is a method in which a plurality of slave station apparatuses commonly use a transmission medium and a transmission band, and a host station apparatus posts band allocation information for controlling allocation of use transmission bands of the slave station apparatuses to the slave station apparatuses, and the respective slave station apparatuses transmit data to the host station apparatus based on the band allocation information posted from the host station apparatus. The optical burst transmission/reception control method comprises the initial post step of previously posting the band allocation information including identifications of the slave station apparatuses and types of data to be transmitted by the slave station apparatuses from the host apparatus to the plurality of slave station apparatuses; the holding step of holding the band allocation information posted at the initial post step by means of the slave station apparatuses; the post step of posting the band allocation information including instruction of bands from the host station apparatus to the slave station apparatuses; and data transmission control step of identifying as to whether or not the band allocation information posted at the post step is band allocation information about data types of the slave station apparatuses respectively by means of the slave station apparatuses, and when the band allocation information is the band allocation information about the data types of the slave station apparatuses, making control to transmit data to the host station apparatus according to the data types represented by the band allocation information.

According to the above-mentioned aspect, at the initial post step, the host station apparatus previously posts the band allocation information including identifications of the slave station apparatuses and types of data to be transmitted by the slave station apparatuses to the plural slave station apparatuses, and at the holding step the slave station apparatuses hold the band allocation information posted at the initial post step, and at the post step the host station apparatus posts the band allocation information including band instruction to the slave station apparatuses, and at the data transmission control step the slave station apparatuses identify as to whether or not the band allocation information posted at the post step is their band allocation information for data types of the slave station apparatuses, and when the band allocation information is band allocation information for the data types of the slave station apparatuses, the slave station apparatuses make control to transmit the data to the host station apparatus according to the data types represented by the band allocation information. For this reason, for example in the case where periodic data such as sound data which require the real-time property and have fixed periodicity, and burst data which are generated by transmission request intermittently or temporarily exist one slave station apparatus, a band for the burst data is controlled separately from the periodic data.

In the above-mentioned optical burst transmission/reception control method, the band allocation information posted at the initial post step and at the post step is information about a plurality of grouped data types.

Thus, the band allocation information which are posted by the initial post step and the post step is information about plural grouped data types.

The above-mentioned optical burst transmission/reception control method further comprises the detection step of detecting as to whether or not burst data are input into the slave station apparatuses by the slave station apparatuses; and the band request step of, when the detection step detects the input of the burst data, transmitting band request of the burst data to the host station apparatus, wherein when the host station apparatus detects the band request, the post step posts the band request including the band allocation information about the burst data to the slave station apparatuses.

Thus, at the detection step the slave station apparatus detects as to whether or not burst data are input into itself, and when the detection step detects input of burst data, at the band request step band request for the burst data is transmitted to the host station apparatus, and when the host station apparatus detects the band request, at the post step the band allocation information for the burst data is included in the band request so as to be posted to the slave station apparatus.

BEST MODE FOR CARRYING OUT THE INVENTION

Embodiments of the optical burst transmission/reception control system, the host station apparatus and the slave station apparatus to be used in the system, and the optical burst transmission/reception control method of the present invention will be explained below with reference to the accompanying drawings.

First Embodiment

Figure 1:
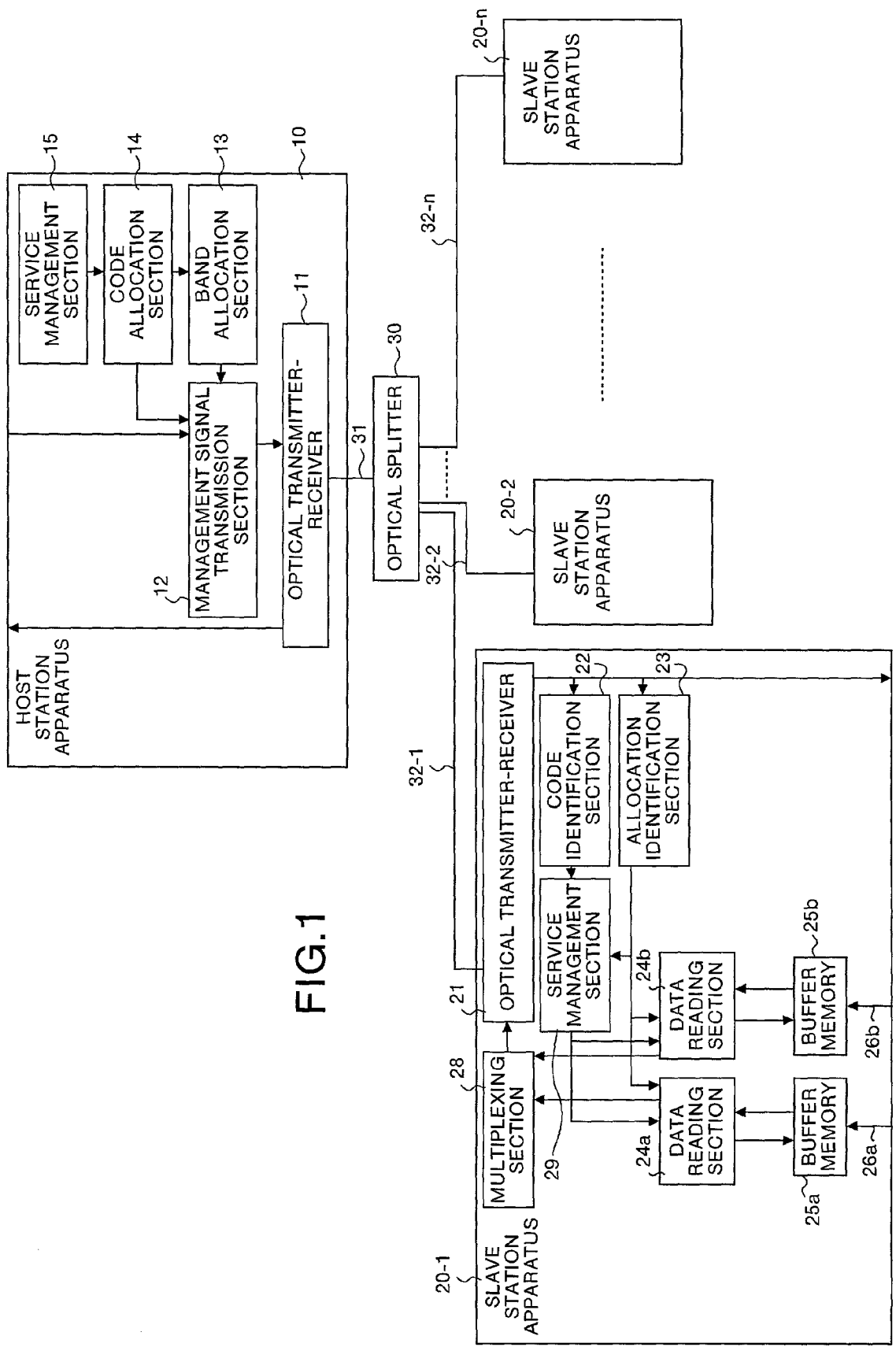
FIG. 1 is a block diagram showing a structure of an optical burst transmission/reception control system according to a first embodiment of the present invention.

FIG. 1 is a block diagram showing a structure of the optical burst transmission/reception control system according to the first embodiment of the present invention. In FIG. 1, in the optical burst transmission/reception control system, a service management section 15 is further provided in the optical burst transmission/reception control system shown in FIG. 9, and a service identification section 29 is further provided in the slave station apparatuses 20-1 through 20-n. Moreover, instead of the data reading section 24 in the optical burst transmission/reception control system shown in FIG. 9, data reading sections 24a and 24b for reading data from buffer memories 25a and 25b are provided. A multiplexing section 28 is provided instead of the multiplexing section 27, and the multiplexing section 28 multiplexes data read by the data reading sections 24a and 24b so as to transmit them to an optical transmitter-receiver 21. The other parts of the structure are the same as those in the optical burst transmission/reception control system shown in FIG. 9, and the same reference numerals are given to the same parts of the structure.

In FIG. 1, the service management section 15 makes different codes as values of "GRANT" have one to one correspondence to respective types of data input into the slave station apparatuses 20-1 through 20-n, and transmits this correspondence information to a code allocation section 14. The types of data are classified into periodic data and burst data. Similarly to the code allocation section 14 shown in FIG. 9, the code allocation section 14 transmits the code values to a management signal transmission section 12, and the management signal transmission section 12 transmits a management signal including this code values to the slave station apparatuses 20-1 through 20-n via an optical transmitter-receiver 11, a main fiber 31, an optical splitter 30, branch fibers 32-1 through 32-n.

Figure 9:
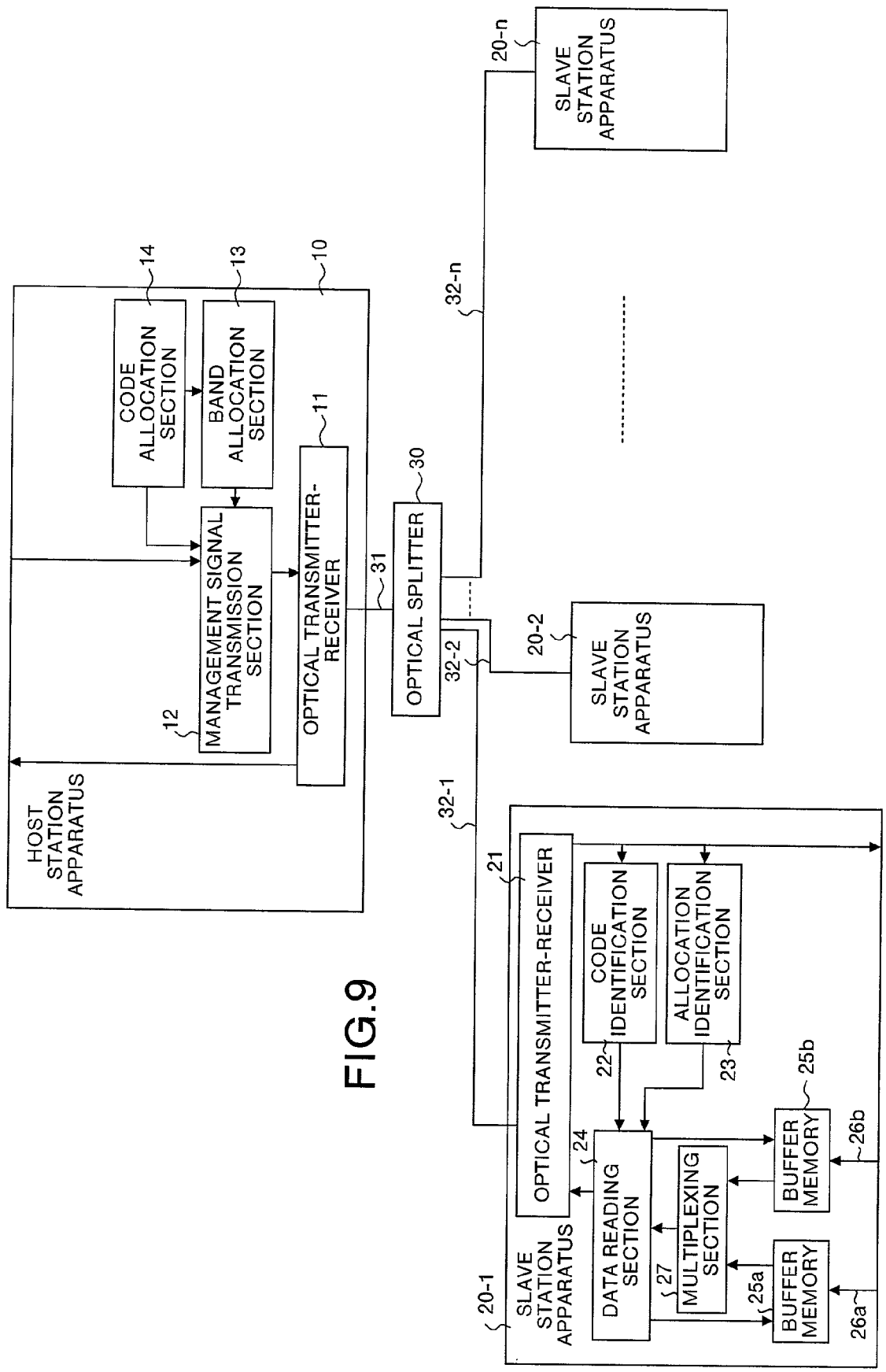
FIG. 9 is a block diagram showing a structure of a conventional optical burst transmission/reception control system.
Figure 10:
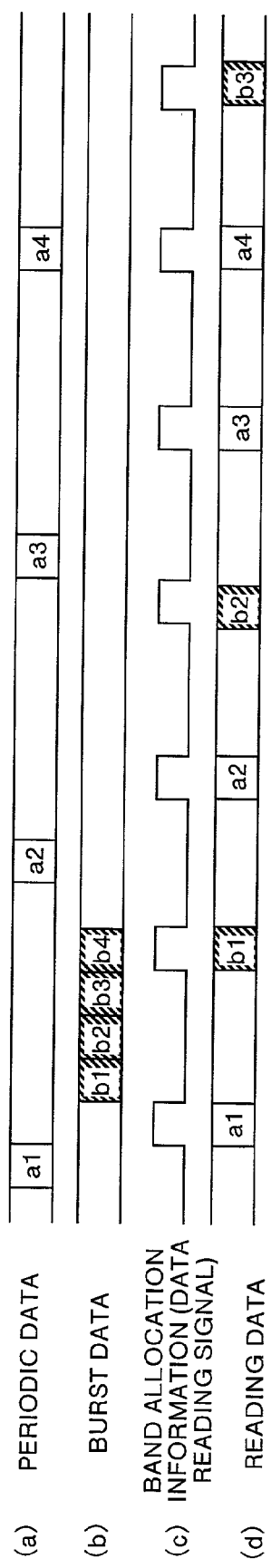
FIG. 10 is a timing chart showing reading control of periodic data and burst data in a slave station apparatus shown in FIG. 9.
Figure 11:
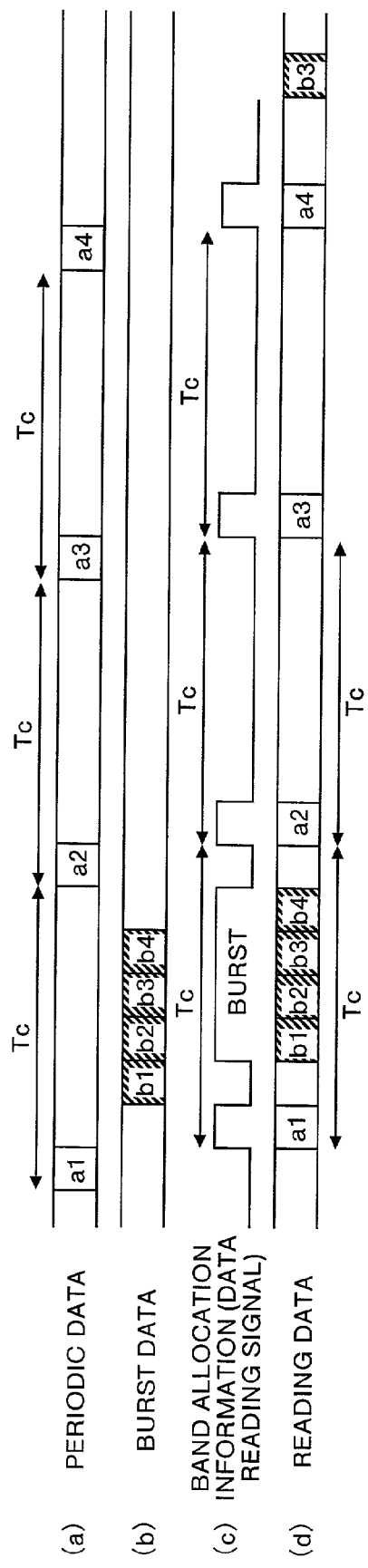
FIG. 11 is a timing chart showing another reading control of the periodic data and burst data in the slave station apparatus shown in FIG. 9.
Figure 12:
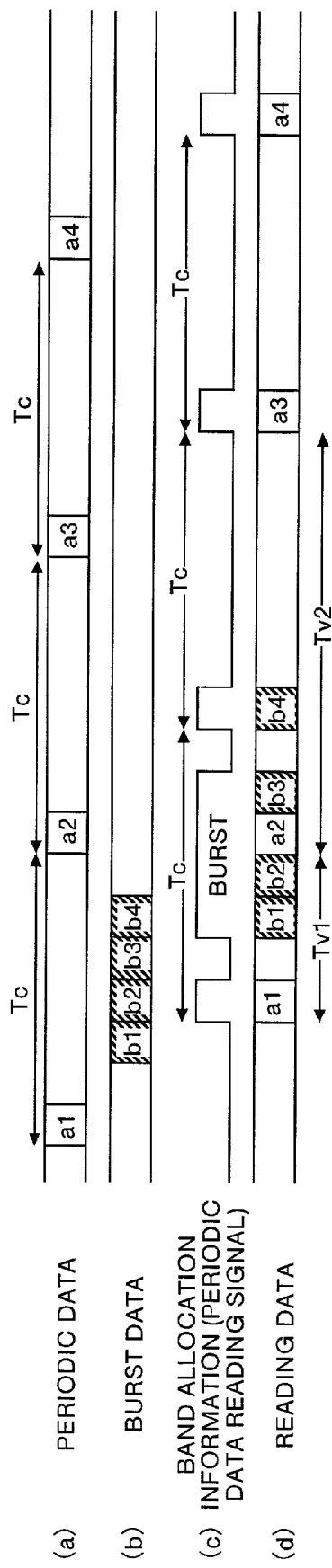
FIG. 12 is a timing chart showing one example of another reading control of the periodic data and burst data in the slave station apparatus shown in FIG. 9.

Similarly to the code identification section 22 shown in FIG. 9, the code identification sections 22 of the slave station apparatuses 20-1 through 20-n fetch identification numbers which are preset in the respective slave station apparatuses and the code values (values of GRANT) having one to one correspondence to the identification numbers and store them. As a result, data transmission control for the respective types of data from the slave station apparatuses 20-1 through 20-n to the host station apparatus 10 is initialized. The service identification sections 29 post the values of "GRANT" of periodic data to the data reading sections 24a for reading periodic data, and post the values of "GRANT" of burst data to the data reading sections 24b for reading burst data.

Thereafter, a band allocation section 13 of the host station apparatus 10 inserts the values of "GRANT", which are preset according to the types of data for the respective slave station apparatuses 20-1 through 20-n, into upstream slot allocation areas in a down stream management signal with a frequency according to bands required by various data in the slave station apparatuses 20-1 through 20-n, and transmits them to the management signal transmission section 12. The management signal transmission section 12 transmits the management signal to the slave station apparatuses 20-1 through 20-n via the optical transmitter-receiver 11, the main fiber 31, the optical splitter and the branch fibers 32-1 through 32-n.

Allocation identification section s23 of the slave station apparatuses 20-1 through 20-n detect the values of "GRANT" in the management signal and posts them to the data reading sections 24a and 24b. The data reading sections 24a and 24b check the values of the upstream slot allocation areas input from the allocation identification sections 23, and when the values match with the code values (values of GRANT) posted from the service identification sections 29, the data reading sections 24a and 24b try to read data from the buffer memories 25a and 25b respectively with respect to upstream time slots corresponding to the matched slots. When data exist, the data reading sections 24a and 24b transmit the read data to the multiplexing sections 28, and when data do not exist, they generate and transmit empty data to the multiplexing sections 28. The multiplexing sections 28 multiplex the input data and transmit them to the optical transmitter-receivers 21, and transmits them to the host station apparatus 10 via the branch fibers 32-1 through 32-n, the optical splitter 30 and the main fiber 31.

Figure 2:
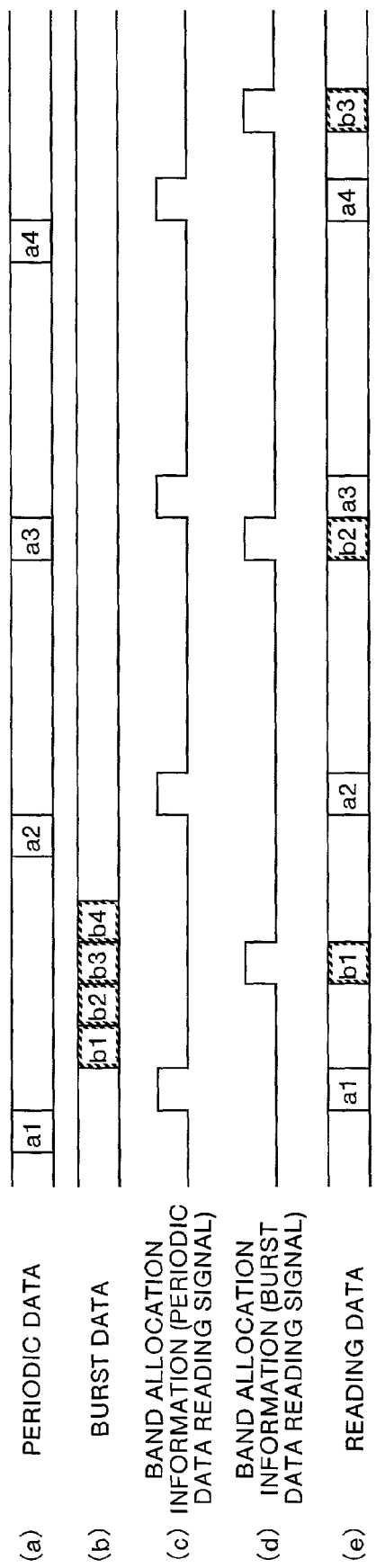
FIG. 2 is a timing chart showing reading control of periodic data and burst data in a slave station apparatus shown in FIG. 1.

With reference to the timing chart shown in FIG. 2, there will be explained below data output of periodic data "a1" through "a4" and burst data "b1" through "b4" in the slave station apparatuses 20-1 through 20-n. FIGS. 2(a) and 2(b) show the periodic data "a1" through "a4" and the burst data "b1" through "b4". FIG. 2(c) shows a periodic data reading signal, which corresponds to band allocation information for the periodic data and represents timing at which the data reading sections 24a read periodic data 26a ("a1" through "a4") from the buffer memories 24a. Moreover, FIG. 2(d) shows a burst data reading signal, which corresponds to band allocation information for the burst data and represents timing at which the data reading sections 24b read burst data 26b ("b1" through "b4") from the buffer memories 25b. Further, FIG. 2(e) shows reading data which are read by the periodic data reading signal and the burst data reading signal and are output from the data reading sections 24a and 24b.

The band allocation information detected by the allocation identification sections 23 is input with an interval corresponding to bands required for the transmission of the periodic data and burst data, and the periodic data reading signal and the burst data reading signal shown in FIGS. 2(c) and 2(d) are generated according to the input. The data reading sections 24a and 24b read the periodic data "a1" through "a4" and the burst data "b1" through "b4" according to the periodic data reading signal and the burst data reading signal respectively. As a result, the periodic data "a1" through "a4" are read with an interval of the slots allocated to the periodic data so as to be transmitted to the host station apparatus 10, and thus periodicity of the periodic data is maintained.

According to the first embodiment, the service management section 15 of the host station apparatus 10 provides values of "GRANT" for respective types of data to the slave station apparatuses 20-1 through 20-n so as to control the bands, and the slave station apparatuses 20-1 through 20-n read data for the respective types of the data. For this reason, for example in the case where periodic data and burst data are transmitted from one slave station, the data can be transmitted to the host station apparatus 10 in a state that the periodicity is maintained without deteriorating the periodicity of the periodic data.

Second Embodiment

A second embodiment of the present invention will be explained below. In the first embodiment, all the slave station apparatuses 20-1 through 20-n have the same structure, but in the second embodiment the system is constituted so that the slave station apparatuses 20-1 through 20-n in the first embodiment and the slave station apparatuses 20-1 through 20-n shown in FIG. 9 coexist.

Figure 3:
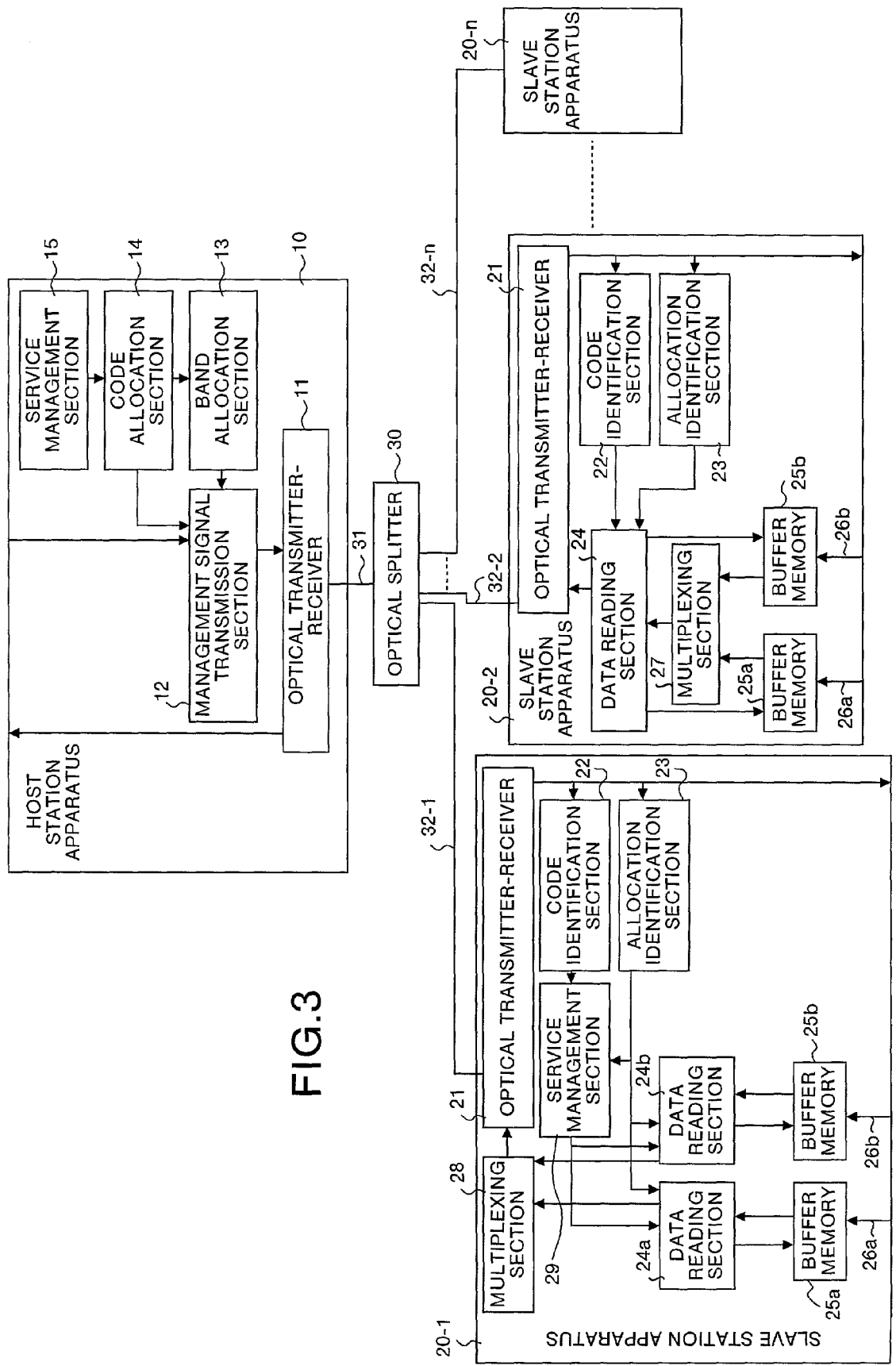
FIG. 3 is a block diagram showing the optical burst transmission/reception control system according to a second embodiment of the present invention.

FIG. 3 is a block diagram showing the structure of the optical burst transmission/reception control system according to the second embodiment of the present invention. In FIG. 3, as for the slave station apparatuses 20-1 through 20-n, the slave station apparatuses having the structure of the slave station apparatuses 20-1 through 20-n in the first embodiment and the slave station apparatuses having the structure of the slave station apparatuses 20-1 through 20-n shown in FIG. 9 coexist as mentioned above. For example, the slave station apparatus 20-1 has the same structure as that of the slave station apparatuses 20-1 through 20-n in the first embodiment, and the slave station apparatus 20-n has the same structure as that of the slave station apparatuses 20-1 through 20-n shown in FIG. 9. The other parts of the structure are the same as in the first embodiment and the same reference numerals are given to the common parts of the structure.

Here, since the post of initial setting in the slave station apparatuses 20-1 through 20-n from the host station apparatus 10 or the control using band allocation information is carried out independently in the slave station apparatuses 20-1 through 20-n, the post and the control between the host station apparatus 10 and the slave station apparatus 20-1 are carried out similarly to the first embodiment, and the post and the control between the host station apparatus 10 and the slave station apparatus 20-2 are carried out similarly to the conventional optical burst transmission/reception control system shown in FIG. 9.

According to the second embodiment, similarly to the first embodiment, the periodicity of the periodic data can be maintained, and the system can be constituted so that the conventional slave station apparatus 20-2 coexists. For this reason, the flexible system can be structured.

Third Embodiment

A third embodiment of the present invention will be explained below. In the second embodiment the system where the slave station apparatuses 20-1 through 20-n in the first embodiment and the conventional slave station apparatuses 20-1 through 20-n shown in FIG. 9 coexist is structured, but in the third embodiment the system is structured so that the internal structure of the slave station apparatuses 20-1 through 20-n in the first embodiment is mixed with the internal structure of the conventional slave station apparatuses 20-1 through 20-n shown in FIG. 9.

Figure 4:
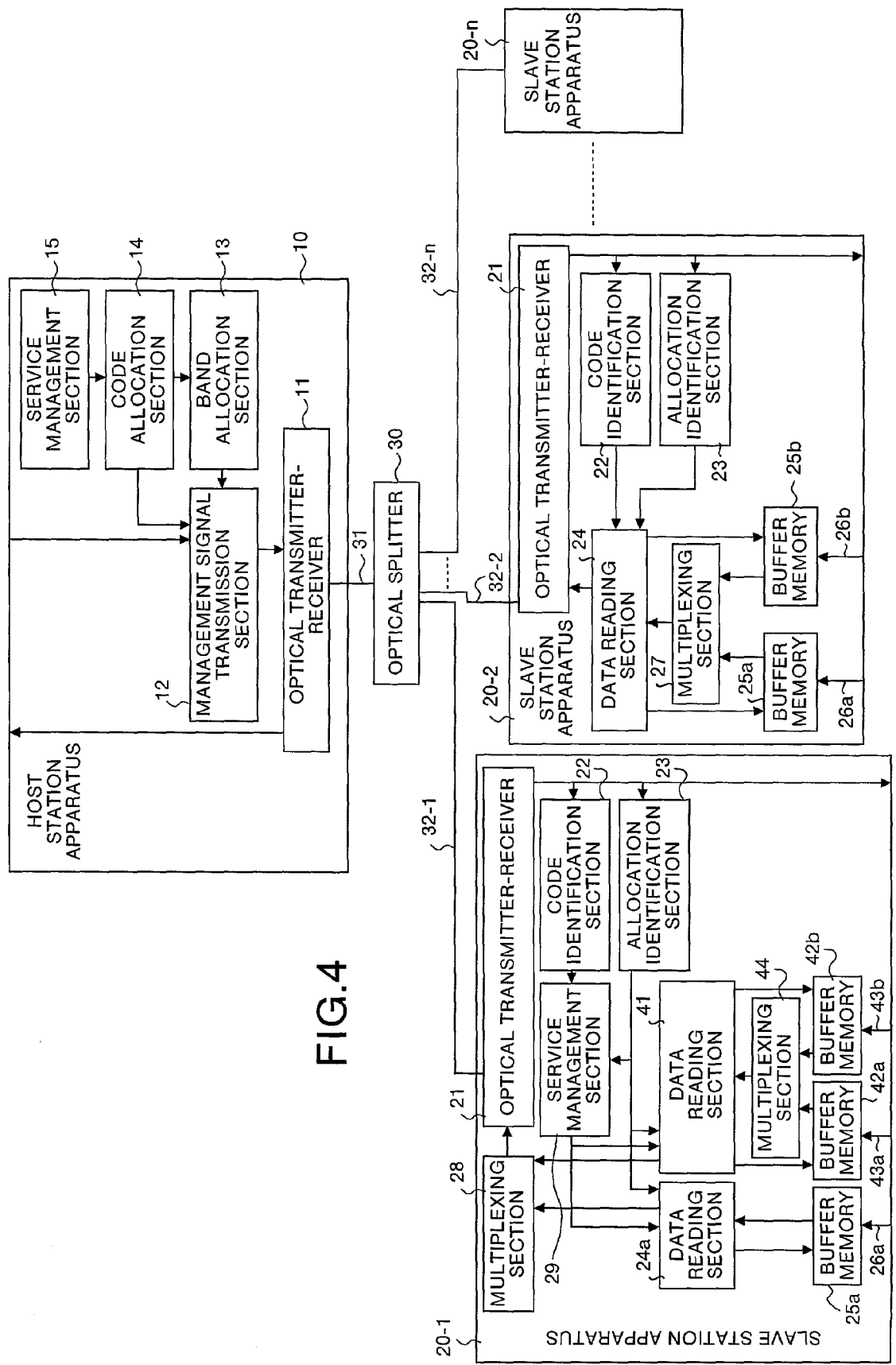
FIG. 4 is a block diagram showing the optical burst transmission/reception control system according to a third embodiment of the present invention.

FIG. 4 is a block diagram showing the structure of the optical burst transmission/reception control system according to the third embodiment of the present invention. In FIG. 4, the slave station apparatus 20-1 is provided with a data reading section 41, two buffer memories 42a and 42b and a multiplexing section 44 instead of the data reading section 24b band the buffer memory 25b in the second embodiment. The data reading section 41, the two buffer memories 42a and 42b, and the multiplexing section 44 correspond to the data reading section 24 and the two buffer memories 25a and 25b, and the multiplexing section 27 shown in FIG. 9. In FIG. 4, the slave station apparatuses 20-1 through 20-n may have the same structure of the slave structure 20-1, but in FIG. 4 the structure of the slave station apparatus 20-2 is the same as the structure of the slave structure apparatuses 20-1 through 20-n shown in FIG. 9. Namely, the slave station apparatuses 20-1 through 20-n shown in FIG. 9 coexist. The other parts of the structure are the same as in the second embodiment, and the same reference numerals are given to the common parts of the structure.

The service management section 15 of the host station apparatus 10 makes codes values as values of "GRANT" correspond to type groups of data to be input into the slave station apparatus 20-1, and transmits the correspondence information and band ratio of the groups to the code allocation section 14. For example, in the slave station apparatus 20-1, since periodic data are input into the buffer memory 25a and two types of burst data are input into the buffer memories 42a and 42b respectively, the service management section 15 sets the two types of the burst data "1" (43a) and "2" (43b) as one group, and makes one code of a value of "GRANT" correspond to this group. Moreover, the service management section 15 makes one type of periodic data correspond to one code of a value of "GRANT". As a result, the service management section 15 makes the slave station apparatus 20-1 correspond to two different values of "GRANT". Further, a band ratio is set for the two types of burst data 43a and 43b. Here, the slave station apparatus 20-2 is made to correspond to one value of "GRANT". The information is transmitted to the management signal transmission section 12, and the management signal transmission section 12 inserts the information into a management signal so as to transmit it to the slave station apparatuses 20-1 through 20-n.

The service identification section 29 of the slave station apparatus 20-1 recognizes the value of "GRANT" set for the periodic data 26a, the values of "GRANT" set for the burst data 43a and 43b and the band ratio, and posts the value of "GRANT" set for the periodic data 26a to the data reading section 24a, and posts the values of "GRANT" set for the burst data 43a and 43b and the band ratio to the data reading section 41.

Thereafter, the band allocation section 13 of the host station apparatus 10 transmits the values of "GRANT", which are preset for the periodic data 26a and the burst data 43a and 43b in the slave station apparatus 20-1, to the management signal transmission section 12 according to a frequency corresponding to a band required by the periodic data 26a and a frequency corresponding to a total band required by the burst data 43a and 43b in the slave station apparatus 20-1. The management signal transmission section 12 inserts the input values of "GRANT" into the upstream slot allocation areas in the management signal so as to transmit them to the slave station apparatus 20-1. This management signal is similarly transmitted with a frequency corresponding to a total sum of the bands required by the various data to be input into the slave station apparatuses 20-1 through 20-n. The values of "GRANT" which are preset for the slave station apparatuses 20-1 through 20-n are inserted into the upstream slot allocation areas in the management signal.

Meanwhile, the allocation identification section 23 of the slave station apparatus 20-1 detects the values of "GRANT" in the management signal input from the host station apparatus 10, and posts the values of "GRANT" to the data reading sections 24a and 24b. The data reading sections 24a and 24b check the values of "GRANT" input from the allocation identification section 23, and when the values match with the codes (values of GRANT) posted from the service identification section 29, the data reading sections 24a and 24b attempt to read the data in the buffer memories 25a and 42a correspondingly to upstream time slots corresponding to the values of "GRANT" which are detected as the matched values. When the data exist, the data reading sections 24a and 24b transmit the data to the multiplexing section 28, and when the data to be read do not exist, they generate empty data so as to transmit them to the multiplexing section 28.

At this time, the data reading section 41 controls a reading time ratio of the burst data 43a in the buffer memory 42a to the burst data 43b in the buffer memory 42b based on the band ratio in the group transmitted from the service identification section 29. For example, in the case where the band ratio of the burst data 43a to the burst data 43b is 1:2, the first reading is executed for the buffer memory 42a once and for the buffer memory 42b twice. In the case where data to be read do not exist in one buffer memory, the data reading section 41 attempts to read from the other buffer memory. The read data are transmitted to the multiplexing section 44 and are transmitted from the data reading section 41 to the multiplexing section 28, but in the case where data to be read do not exist in the buffer memories 42a and 42b, the data reading section 41 generates empty data so as to transmit them to the multiplexing section 28.

The data, which were transmitted from the data reading sections 24a and 24b and are multiplexed by the multiplexing section 28, are transmitted to the host station apparatus 10 via the branch fibers 32-1 through 32-n, the optical splitter 30 and the main fiber 31.

Since the post of the initial setting and the control using the band allocation information from the host station apparatus 10 to the slave station apparatuses 20-1 through 20-n are carried out independently for the slave station apparatuses 20-1 through 20-n, the post and the control between the host station apparatus 10 and the slave station apparatus 20-1 are carried out according to the above-mentioned processing procedure, and the post and the control between the host station apparatus 10 and the slave station apparatus 20-2 are executed similarly to the conventional optical burst transmission/reception control system shown in FIG. 9.

The slave station apparatuses 20-1 through 20-n in the first embodiment are connected as the slave station apparatuses in the fourth embodiment, and the slave station apparatuses in the first embodiment, the slave station apparatuses in the third embodiment and the conventional slave station apparatuses shown in FIG. 9 may coexist.

According to the third embodiment, even if the structure where a plurality of buffer memories are connected to one data reading section, the data stored in the plural buffer memories form groups, and one value of "GRANT" is set for each of the groups, and the band ratio of the data in the group is set. For this reason, the band for the respective data in the group can be controlled collectively and flexibility of the structure can be secured. Moreover, also in this case, similarly to the first and second embodiments, the periodicity of the periodic data is not deteriorated.

Fourth Embodiment

A fourth embodiment of the present invention will be explained below. In the first through third embodiments, the bands in the slave station apparatuses 20-1 through 20n are controlled based on the post of the band allocation information such as the values of "GRANT" from the host station apparatus 10, but in the fourth embodiment the bands are requested from the slave station apparatuses 20-1 through 20-n, and the host station apparatus 10 controls band allocation of the slave station apparatuses 20-1 through 20-n based on the band request.

Figure 5:
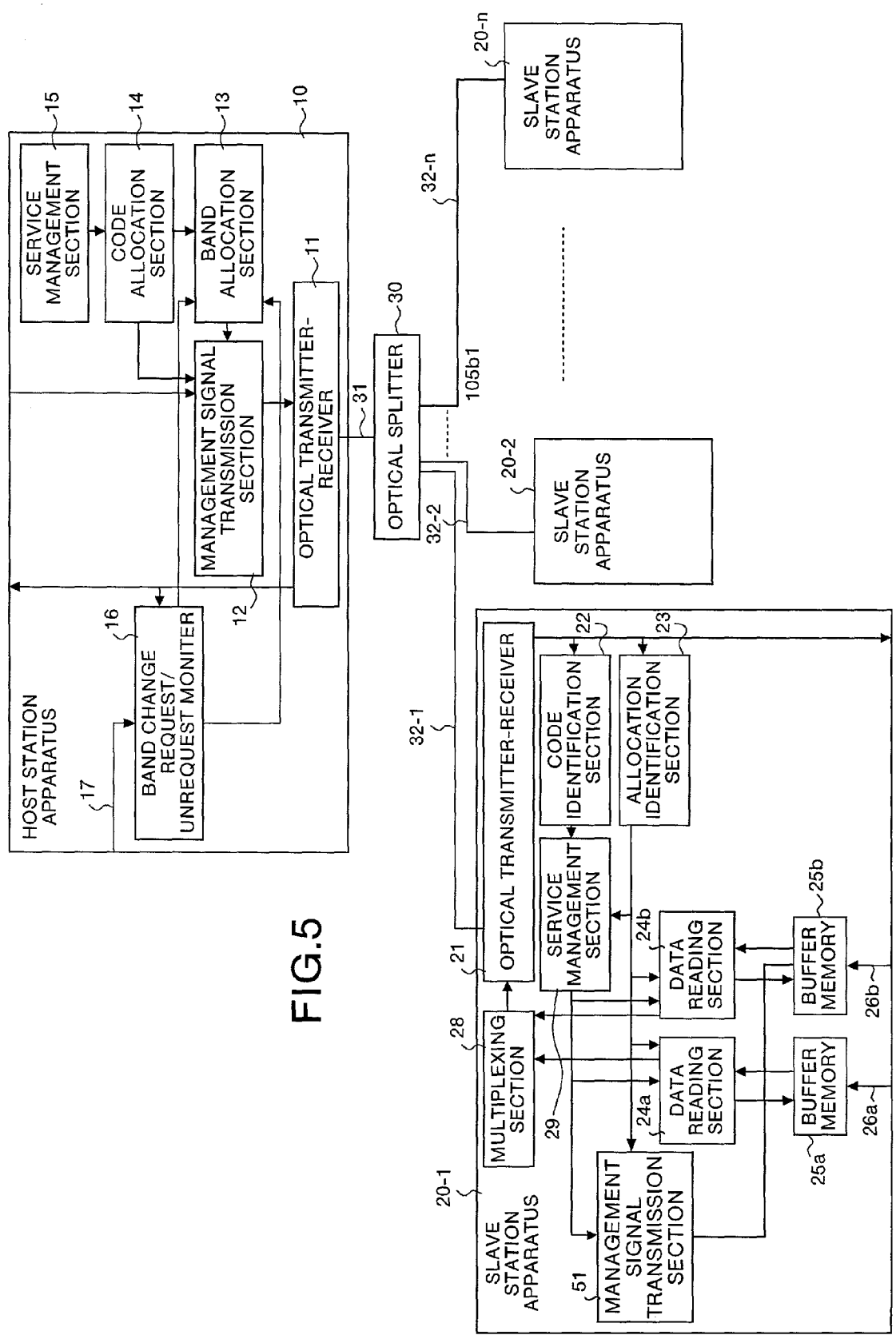
FIG. 5 is a block diagram showing the optical burst transmission/reception control system according to a fourth embodiment of the present invention.

FIG. 5 is a block diagram showing a structure of the optical burst transmission/reception system according to the fourth embodiment of the present invention. In FIG. 5, the slave station apparatus 20-1 through 20-n are further provided with a management signal transmission section 51 for transmitting a band change request included in a management signal, and the host station apparatus 10 is further provided with a band change request/unrequest monitor 16 for monitoring a band change request signal in the management signal. The other parts of the structure are the same as in the first embodiment, and the same reference numerals are given to the common parts of the structure.

The service management section 15 of the host station apparatus 10 makes codes as values of "GRANT correspond to types of data to be input into the slave station apparatuses 20-1 through 20-n using different values for the respective slave station apparatuses 20-1 through 20-n, and transmits the correspondence information to the code allocation section 14. Further, the service management section 15 makes codes as values of "GRANT" for transmitting management signals from the slave station apparatuses 20-1 through 20-n correspond respectively to the slave station apparatuses 20-1 through 20-n using different values, and transmits the information to the code allocation section 14. The code allocation section 14 transmits the code values to the management signal transmission section 12, and the management signal transmission section 12 transmits the corresponded code values as the management signals to the slave station apparatuses 20-1 through 20-n.

The service identification section 29 of the slave station apparatus 20-1 recognizes the value of "GRANT" set for the periodic data 26a, the value of "GRANT" set for the burst data 26b and the value of "GRANT" set for the management signal from the slave station apparatus 20-1. The service identification section 29 posts the value of "GRANT" set for the periodic data 26a to the data reading section 24a, the value of "GRANT" set for the burst data 29b to the data reading section 24b, and the value of "GRANT" set for the management signal to the management signal transmission section 51.

Thereafter, the band allocation section 13 of the host station apparatus 10 transmits the values of "GRANT" which are preset for the various data and the management signals in the slave station apparatuses 20-1 through 20-n to the management signal transmission section 12 with a frequency according to the preset bands of the data and the preset band of the management signals. The management signal transmission section 12 transmits the management signals into which the input values of "GRANT" are input into the upstream slot allocation areas to the slave station apparatuses 20-1 through 20-n. However, "0" as an initial value is set in the band for the burst data 26b, and a value of "GRANT" is not allocated to the burst data 26b.

In the slave station apparatus 20-1, in the case where the burst data 26b are input into the buffer memory 25b and transmission of the burst data 26b is required, the necessity of the data transmission is posted from the buffer memory 25b to the management signal transmission section 51. In another way, the management signal transmission section 51 monitors a stored stat of the burst data 26b in the buffer memory 25b.

When the management signal transmission section 51 accepts the post from the buffer memory 25b, it waits until the preset value of "GRANT" of the management signal is input from the allocation identification section 23, and when the value of "GRANT is input from the allocation identification section 23, the management signal transmission section 51 transmits the upstream management signal in which the transmission request of the burst data 26b is included to the multiplexing section 28 and transmits this management signal to the host station apparatus 10 via the optical transmitter-receiver 21.

The band change request/unrequest monitor 16 of the host station apparatus s10 monitors this upstream management signal and detects the transmission request of the burst data 26b in the management signal. When this transmission request is detected, the band change request/unrequest monitor 16 posts the band change request to the band allocation section 13. The band allocation section 13 allocates a band to the burst data 26b based on this band change request, and transmits the value of "GRANT" for the burst data 26b to the management signal transmission section 12 with a frequency according to the allocation. The management signal transmission section 12 inserts the value of "GRANT" into the upstream slot allocation areas in the downstream management signal and transmits the downstream management signal to the slave station apparatus 20-1 via the optical transmitter-receiver 11. As a result, the data reading section 24b of the slave station apparatus 20-1 reads the burst data 26b in the buffer memory 25b, and places the burst data 26b on a specified time slot so as to transmit the data to the host station apparatus 10.

Figure 6:
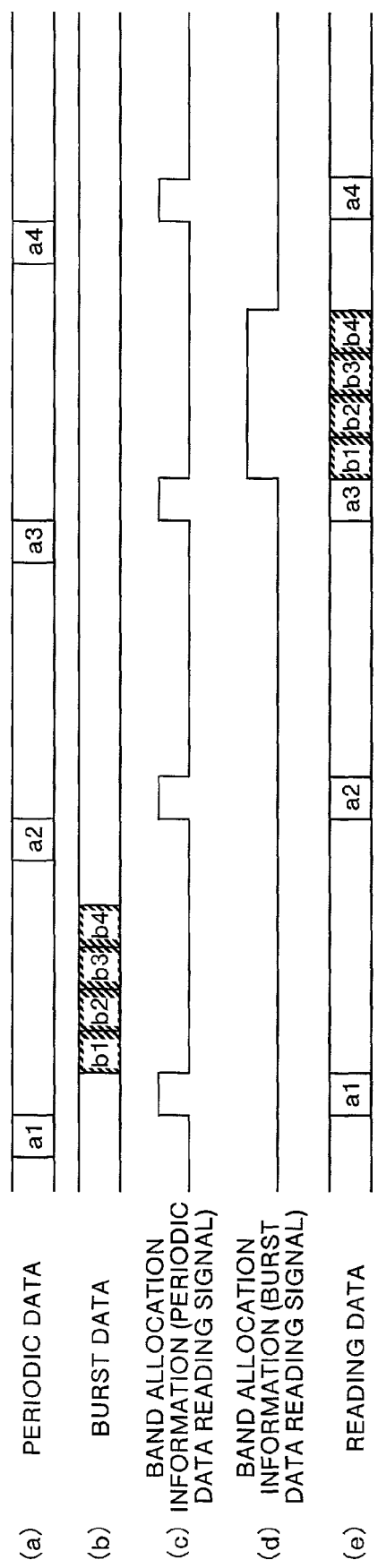
FIG. 6 is a timing chart showing the reading control of periodic data and burst data in a slave station apparatus shown in FIG. 5.
Figure 7:
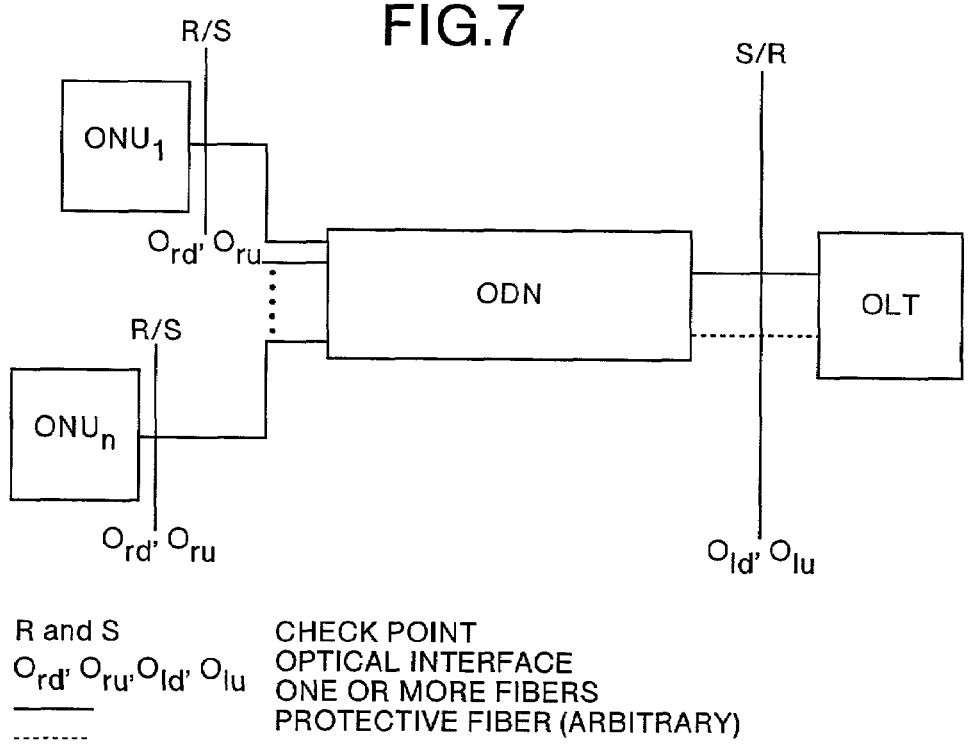
FIG. 7 is a block diagram showing a whole schematic structure of a conventional optical burst transmission/reception control system.
Figure 8:
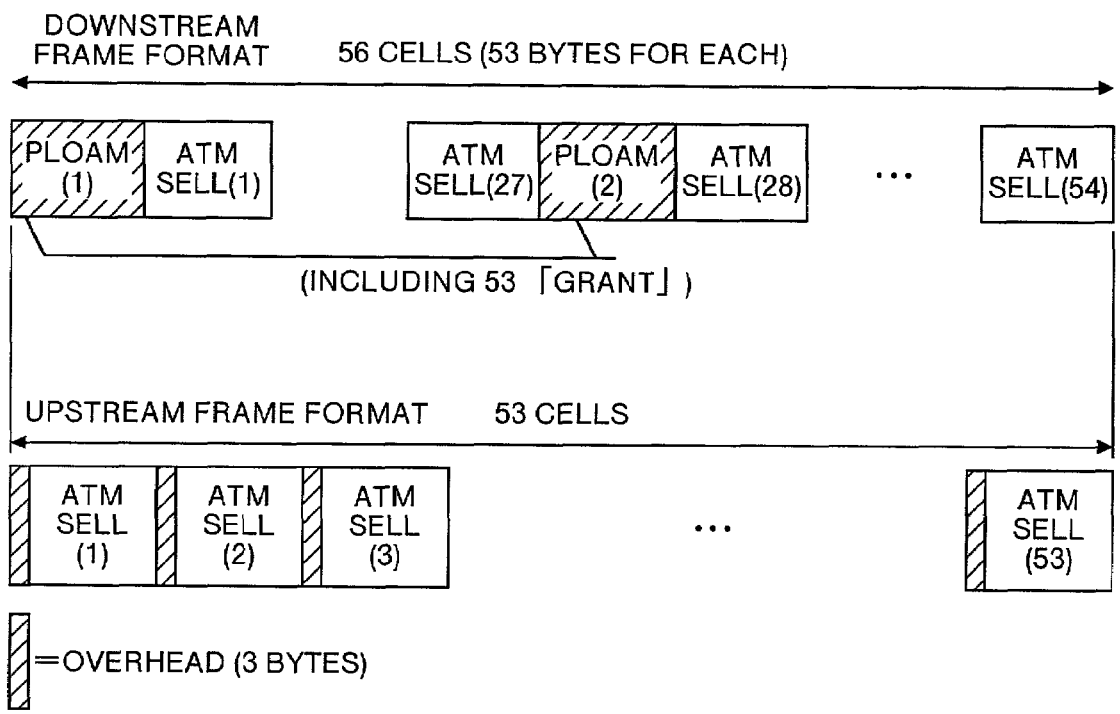
FIG. 8 is a diagram showing formats of upstream frame and downstream frame.

The management signal transmission section 51 allows a stored amount, a transmission delay allowable amount or input time of the burst data 26b to be included in the upstream management signal so that as shown in FIG. 6(b) the band allocation section 13 can output the band allocation information for the burst data in the burst manner. In this case, not the preset band but an actually necessary band can be allocated to the burst data 26b, and thus a band of a transmission line can be used efficiently.

In addition, since the post and the band control from the host station apparatus 10 to the slave station apparatuses 20-1 through 20-n are controlled independently in the slave station apparatuses 20-1 through 20-n, the reading control of the periodic data 26a in the slave station apparatuses 20-1 through 20-n is the same as the reading control of the periodic data 26a in the slave station apparatuses 20-1 through 20-n in the first embodiment. As a result, in the transmission of periodic data between the host station apparatus 10 and the slave station apparatuses 20-1 through 20-n, the periodicity of periodic data can be maintained.

Similarly to the second and third embodiments, slave station apparatuses having another structure may be connected as the slave station apparatuses 20-1 through 20-n and they may be coexist. Moreover, the band change request/unrequest monitor 17 may allocate bands based on not only the transmission request from the upstream management signal but also a band change request signal 17 input from an apparatus connected to the host station apparatus 10.

According to the fourth embodiment, similarly to the first through third embodiments, the periodicity of periodic data can be maintained, and the transmission of burst data is requested from the slave station apparatuses 20-1 through 20-n, and a band which is actually required for the transmission of burst data is allocated based on this transmission request. For this reason, a band of the transmission line can be used efficiently.

As explained above, according to the present invention, a band allocation control unit of the host station apparatus generates the band allocation information including identifications of the slave station apparatuses and types of data to be transmitted by the slave station apparatuses, and posts the information to the plural slave station apparatuses, and a data transmission control unit of the plural slave station apparatuses identify as to whether or not the band allocation information is band allocation information for the types of data in their slave station apparatuses, and when the band allocation information is the band allocation information for the types of data in their slave station apparatuses, the data transmission control unit controls itself to transmit data to the host station apparatus according to the types of data represented by the band allocation information. For this reason, in the case where periodic data such as sound data having constant periodicity which requires the real-time property and burst data which are generated by the transmission request intermittently or temporarily exist in one slave station apparatus, the band control for the burst data is made separately from the periodic data. For this reason, the periodicity of the periodic data can be maintained securely, and a delay of transmission of the periodic data can be suppressed minimally.

Moreover, since the host station apparatus posts the band allocation information which is included in a management information cell to the respective slave station apparatuses, the band allocation information can be posted securely to the slave station apparatuses securely.

Furthermore, since the band allocation information is use authorizing information of time slots specified in the transmission direction from the slave station apparatus to the host station apparatuses, the band control is realized easily only by specifying the upstream time slots, and the post and identification of the band allocation information and the data transmission control in the slave station apparatuses can be carried out easily and swiftly.

Moreover, since the data types are classified into fixed-speed data which requires the real-time property and should be transmitted with constant period and burst data which are generated by the transmission request intermittently or temporarily, the periodicity of the fixed-speed data can be maintained and the burst data can be transmitted efficiently.

Furthermore, a band request detection unit of the host station apparatus detects generation of an intermittent or temporary band change request, and as initial setting the band allocation control unit allocates a band to fixed-speed data to be transmitted with fixed period. When the band request detection unit detects the band change request, it allocates a band to burst data which are newly generated intermittently or temporarily so that the transmission band can be allocated to burst data efficiently and flexibly.

Moreover, when burst data are generated by the transmission request intermittently or temporarily, a band request unit of the slave station apparatuses request the host station apparatus to allocate a band to the burst data so that only when transmission of the burst data is required, the burst data can be transmitted, and the transmission bands can be used efficiently.

Furthermore, the band allocation information is information about a plurality of data types divided into groups, and the band allocation control unit presets information representing a band ratio between the grouped plural data types in the band allocation information, and the data transmission control unit identifies as to whether or not the band allocation information is band allocation information about the grouped data types of the slave station apparatus. When the band allocation information is the band allocation information about the grouped data type of the slave station apparatus, the data transmission control unit transmits the data of the grouped plural data types represented by the band allocation information according to the band ratio, and thus flexible band control can be made easily.

Moreover, when the band allocation control unit controls band allocation for a slave station apparatus which does not identify a type of data to be transmitted, the band allocation control unit posts band identification information including identification of the slave station apparatus to the slave station apparatus. In the case where the band allocation control unit controls band allocation for a slave station apparatus which does not identify a type of data to be transmitted, the band allocation control unit posts band allocation information including identification of a slave station apparatus and the type of data to the slave station apparatus. Further, slave station apparatuses having various structures and functions coexist. As a result, the periodicity of periodic data is maintained and simultaneously the flexible system can be structured.

According to the next invention, a band allocation control unit generates the band allocation information including identifications of respective slave station apparatuses and types of data to be transmitted by the slave station apparatuses, and posts them to the plural slave station apparatuses. For this reason, for example in the case where periodic data such as sound data which require real-time property and have fixed periodicity, and burst data which are generated by transmission request intermittently or temporarily exist in one slave station apparatus, since a band for the burst data is controlled separately from the periodic data, the periodicity of the periodic data can be maintained securely, and a delay of transmission of the periodic data can be suppressed minimally.

According to the next invention, a data transmission control unit identifies as to whether or not the band allocation information is band allocation information about data types of their station apparatus, and when the band allocation information is band allocation information about the data type of the station apparatus, the data transmission control unit makes control so as to transmit data to the host station apparatus according to data types represented by the band allocation information. For this reason, for example in the case where periodic data such as sound data which require the real-time property and have fixed periodicity, and burst data which are generated by transmission request intermittently or temporarily exist one slave station apparatus, a band for the burst data is controlled separately from the periodic data. For this reason, the periodicity of the periodic data can be maintained securely, and a delay of transmission of the periodic data can be suppressed minimally.

According to the next invention, at the initial post step, the host station apparatus previously posts the band allocation information including identifications of the slave station apparatuses and types of data to be transmitted by the slave station apparatuses to the plural slave station apparatuses, and at the holding step the slave station apparatuses hold the band allocation information posted at the initial post step, and at the post step the host station apparatus posts the band allocation information including band instruction to the slave station apparatuses, and at the data transmission control step the slave station apparatuses identify as to whether or not the band allocation information posted at the post step is their band allocation information for data types of the slave station apparatuses, and when the band allocation information is band allocation information for the data types of the slave station apparatuses, the slave station apparatuses make control to transmit the data to the host station apparatus according to the data types represented by the band allocation information. For this reason, for example in the case where periodic data such as sound data which require the real-time property and have fixed periodicity, and burst data which are generated by transmission request intermittently or temporarily exist one slave station apparatus, a band for the burst data is controlled separately from the periodic data. For this reason, the periodicity of the periodic data can be maintained securely, and a delay of transmission of the periodic data can be suppressed minimally.

Moreover, since the band allocation information which are posted by the initial post step and the post step is information about plural grouped data types, flexible band control can be made easily.

Furthermore, at the detection step the slave station apparatus detects as to whether or not burst data are input into itself, and when the detection step detects input of burst data, at the band request step band request for the burst data is transmitted to the host station apparatus, and when the host station apparatus detects the band request, at the post step the band allocation information for the burst data is included in the band request so as to be posted to the slave station apparatus. For this reason, only when transmission of the burst data is required, the burst data can be transmitted, and transmission bands can be used efficiently.

INDUSTRIAL APPLICABILITY

As mentioned above, the optical burst transmission/reception control system, the host station apparatus, the slave station apparatus and the optical burst transmission/reception control method used in the system of the present invention are suitable for a data transmission system where a plurality of slave station apparatuses commonly use a transmission medium and a transmission band, the host station apparatus posts band allocation information for controlling allocation of the use transmission bands of the slave station apparatuses to the slave station apparatuses, and the slave station apparatuses transmit data to the host station apparatus based on the band allocation information posted from the host station apparatus.

The invention claimed is:

1. An optical burst transmission/reception control system comprising:
   a plurality of slave station apparatuses which commonly use a transmission band, and
   a host station apparatus which posts band allocation information for controlling allocation of use transmission bands of said slave station apparatuses to said slave station apparatuses, wherein said respective slave station apparatuses transmit data to said host station apparatus based on the band allocation information posted from said host station apparatus,
   wherein said host station apparatus has a band allocation control unit, and when the band allocation control unit controls band allocation for a slave station apparatus which does not identify a type of data to be transmitted, said band allocation control unit posts band identification information including identification of the slave station apparatus to the slave station apparatus, and when the band allocation control unit controls band allocation for a slave station apparatus which identifies a type of data to be transmitted, said band allocation control unit posts band allocation information including the identification of the slave station apparatus and the data type to the slave station apparatus, and
   wherein said plurality of slave station apparatuses, which identify a type of data to be transmitted, have a data transmission control unit, and when the band allocation information is the band allocation information about their slave station apparatuses, making control so as to transmit data to said host station apparatus according to the data types.

2. The optical burst transmission/reception control system according to claim 1, wherein said host station apparatus allows the band allocation information to be included in a management information (PLOAM: Physical Layer Operations Administration and Maintenance) cell so as to post it to said respective slave station apparatuses.

3. The optical burst transmission/reception control system according to claim 1, wherein the band allocation information is use authorizing information of time slots (GRANT) defined in a transmission direction from said slave station apparatuses to said host station apparatus.

4. The optical burst transmission/reception control system according to claim 1, wherein the data types are types of fixed-speed data and burst data.

5. The optical burst transmission/reception control system according to claim 1,
   wherein said host station apparatus further has a band request detection unit which detects generation of band request, and
   wherein said band allocation control unit, as initial setting, allocates a band to fixed-speed data, and when said band request detection unit detects band request, said band allocation control unit allocates a band to burst data which are newly generated.

6. The optical burst transmission/reception control system according to claim 1, wherein said slave station apparatuses further have a band request unit which requests said host station apparatus to allocate a band to the burst data.

7. A host station apparatus used in an optical burst transmission/reception control system that includes
   a plurality of slave station apparatuses which commonly use a transmission band, and
   a host station apparatus which posts band allocation information for controlling allocation of use transmission bands of said slave station apparatuses to said slave station apparatuses, wherein said respective slave station apparatuses transmit data to said host station apparatus based on the band allocation information posted from said host station apparatus, said host station apparatus comprises a band allocation control unit, and when the band allocation control unit controls band allocation for a slave station apparatus which does not identify a type of data to be transmitted, said band allocation control unit posts band identification information including identification of the slave station apparatus to the slave station apparatus, and when the band allocation control unit controls band allocation for a slave station apparatus which identifies a type of data to be transmitted, said band allocation control unit posts band allocation information including the identification of the slave station apparatus and the data type to the slave station apparatus.

8. An optical burst transmission/reception control method, in which a plurality of slave station apparatuses commonly use a transmission band, and a host station apparatus posts band allocation information for controlling allocation of use transmission bands of said slave station apparatuses to said slave station apparatuses, and said respective slave station apparatuses transmit data to said host station apparatus based on the band allocation information posted from the host station apparatus, the method comprising:
　　a band allocation control step of when said host station controls band allocation for a slave station apparatus which does not identify a type of data to be transmitted, posting band identification information including identification of the slave station apparatus to the slave station apparatus, and when said host station controls band allocation for a slave station apparatus which identifies a type of data to be transmitted, posting band allocation information including the identification of the slave station apparatus and the data type to the slave station apparatus; and
　　a data transmission control step of when the band allocation information is the band allocation information about said slave station apparatuses which identify a type of data to be transmitted, making control to transmit data to said host station apparatus according to the data types.

9. The optical burst transmission/reception control method according to claim 8, wherein the band allocation information posted at said band allocation control step is information about a plurality of grouped data types.

10. The optical burst transmission/reception control method according to claim 8, further comprising:
　　a detection step of detecting as to whether or not burst data are input into said slave station apparatuses by said slave station apparatuses, which identify a type of data to be transmitted, and
　　a band request step of, when the detection step detects the input of the burst data, transmitting band request of the burst data to said host station apparatus,
　　wherein when said host station apparatus detects the band request, said band allocation control step posts the band request including the band allocation information about the burst data to said slave station apparatuses.

* * * * *